United States Patent [19]

Müller et al.

[11] 4,100,157
[45] Jul. 11, 1978

[54] β-CRYSTALLINE FORM OF THE PIGMENT OBTAINED BY COUPLING DIAZOTIZED 1-AMINOBENZENE-2-CARBOXYLIC ACID METHYL ESTER WITH 2,3-OXYNAPHTHOIC ACID

[75] Inventors: Paul Müller, Basel; Willy Müller, Rhine, both of Switzerland

[73] Assignee: Ciba-Geigy Corporation, Ardsley, N.Y.

[21] Appl. No.: 596,490

[22] Filed: Jul. 16, 1975

Related U.S. Application Data

[63] Continuation of Ser. No. 391,102, Aug. 27, 1973, abandoned.

[30] Foreign Application Priority Data

Sep. 5, 1972 [CH] Switzerland .................. 13034/72

[51] Int. Cl.$^2$ .................. C09B 43/00; C09B 43/12
[52] U.S. Cl. .................. 260/174; 260/208; 106/288 Q
[58] Field of Search .............. 260/174, 177, 184, 186, 260/187, 208, 42.21; 106/288 Q

[56] References Cited

U.S. PATENT DOCUMENTS

| 2,741,658 | 4/1956 | Schmid et al. ............ 260/174 |
| 2,741,659 | 4/1956 | Schmid et al. ............ 260/174 |
| 2,774,755 | 12/1956 | Schmid et al. ............ 260/174 |
| 2,888,453 | 5/1959 | Schmid et al. ............ 260/174 |
| 3,197,457 | 7/1965 | Schetty et al. ............ 260/204 |
| 3,321,458 | 5/1967 | Lohe et al. ............ 260/204 X |
| 3,325,470 | 6/1967 | Ribka ............ 260/204 X |
| 3,555,004 | 1/1971 | Mueller ............ 260/174 X |
| 3,562,249 | 2/1971 | Schnabel et al. ............ 260/184 |
| 3,642,768 | 2/1972 | Ribka ............ 260/204 |

FOREIGN PATENT DOCUMENTS 943,901  6/1956  Fed. Rep. of Germany ....... 260/174

Primary Examiner—Charles F. Warren
Attorney, Agent, or Firm—Vincent J. Cavalieri

[57] ABSTRACT

The disazo pigment of the formula

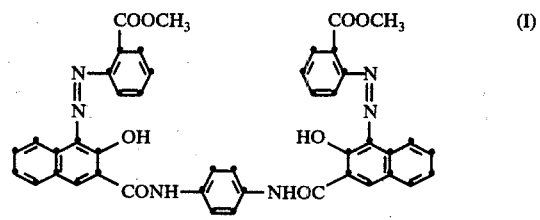

in the β-modification thereof, whose X-ray diffraction pattern at an interplanar spacing of 3.33 A° shows a line of very strong intensity, at 5.38 and 8.33 A° lines of strong intensity, at 3.74, 4.24, 4.68, 4.94, 5.18 and 8.70 A° lines of medium intensity, at 4.05, 4.37, 6.33 and 12.6 A° lines of medium to faint intensity, at 3.50, 3.49, 5.65, 6.09, 6.71, 10.6 and 11.5 A° lines of faint intensity.

The β-modified pigment is a brilliant yellowish red color and may be used to color high molecular weight organic materials such as polycarbonates, polyvinyl chloride and polypropylene.

5 Claims, 3 Drawing Figures

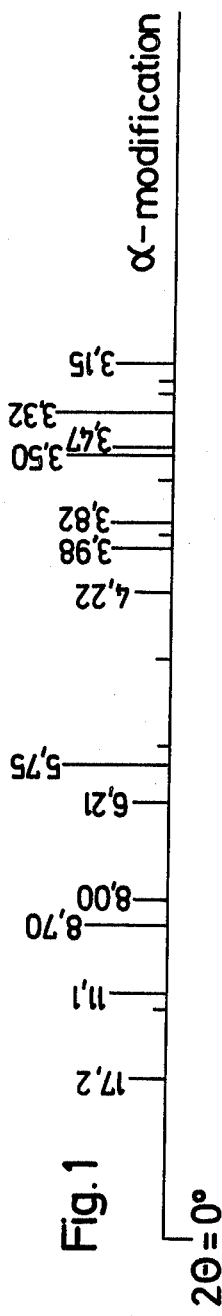
Fig. 1 α-modification
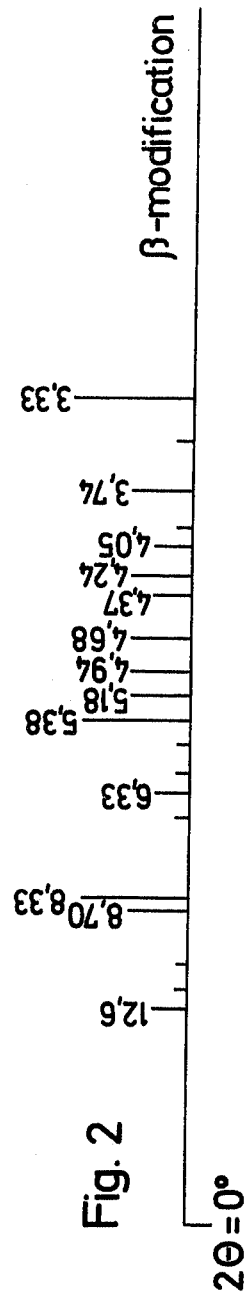
Fig. 2 β-modification
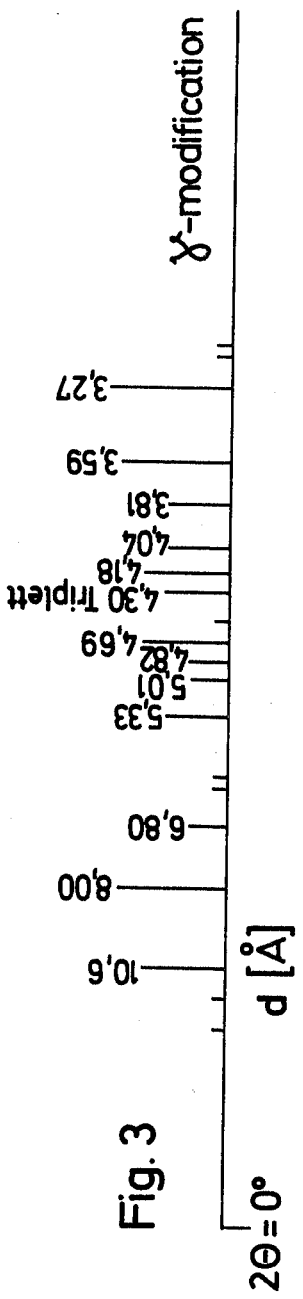
Fig. 3 γ-modification

β-CRYSTALLINE FORM OF THE PIGMENT OBTAINED BY COUPLING DIAZOTIZED 1-AMINOBENZENE-2-CARBOXYLIC ACID METHYL ESTER WITH 2,3-OXYNAPHTHOIC ACID

This is a continuation of application Ser. No. 391,102 filed on Aug. 27, 1973, now abandoned.

In Example 1 of German Pat. No. 943,901 there is described the manufacture of a brown disazo pigment of the Formula

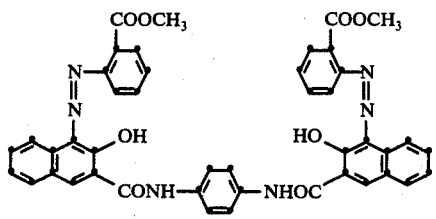
(I)

by condensation of the azocarboxylic acid chloride of the formula

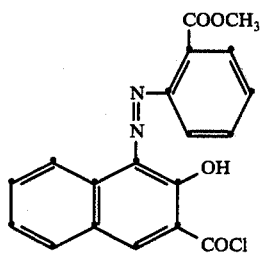
(II)

in the molar ratio 2:1 with p-phenylenediamine in the presence of pyridine in chlorobenzene. While the resulting colourant does show excellent fastness properties, it is colouristically of no interest whatsoever on account of its dull, unattractive hue. FIG. 1 illustrates the X-ray diffraction pattern of this pigment, which will be referred to throughout this specification as the α-modification. It is characterised by the following lines:

| interplanar spacing or d-value in A° | intensity of the line |
| --- | --- |
| 17.2 | medium to faint |
| 11.1 | medium |
| 8.70 | medium to strong |
| 8.00 | medium to faint |
| 6.21 | medium to faint |
| 5.75 | strong |
| 4.22 | medium to faint |
| 3.98 | medium |
| 3.82 | medium |
| 3.50 | strong |
| 3.47 | medium |
| 3.32 | very strong |
| 3.15 | medium |

In the range from 18 to 3.2 A° further faint lines occur, namely at the following $d$ values:
11.8 5.52 4.74 3.89 3.61 3.26 3.21 A°.

The invention is based on the observation that it is possible to obtain a new valuable, brilliant yellowish red crystalline form of the pigment of the formula (I), hereinafter called the β-modification, with the X-ray diffraction pattern of FIG. 2 which is characterised by the following lines:

| interplanar spacing or d value in A° | intensity of the line |
| --- | --- |
| 12.6 | medium to faint |
| 8.70 | medium |
| 8.33 | strong |
| 6.33 | medium to faint |
| 5.38 | strong |
| 5.18 | medium |
| 4.94 | medium |
| 4.68 | medium |
| 4.37 | medium to faint |
| 4.24 | medium |
| 4.05 | medium to faint |
| 3.74 | medium |
| 3.33 | very strong | with further faint lines occurring in the range 13 to 3.3 A°; namely at the following $d$ values:
11.5 10.6 6.71 6.09 5.65 3.94 3.50 A°, by gradually adding a solution of p-phenylenediamine in an inert organic solvent at elevated temperature to a solution of the acid chloride of the formula II in the molar ratio 1:2.

The invention is based on the further observation that it is also possible to obtain a new yellowish red crystalline form of the pigment of the formula (I), hereinafter called the γ-modification, with the X-ray diffraction pattern of FIG. 3 which is characterised by the following lines:

| interplanar spacing or d value in A° | intensity of the line |
| --- | --- |
| 10.6 | medium to strong |
| 8.00 | strong |
| 6.80 | medium to faint |
| 5.33 | medium |
| 5.01 | medium to faint |
| 4.82 | medium to faint |
| 4.69 | medium to strong |
| 4.30 triplet | medium |
| 4.18 | medium to strong |
| 4.04 | medium |
| 3.81 | medium |
| 3.59 | strong |
| 3.27 | very strong | whereby in fully crystallised samples the 4.30 A° line shows the cleavage into a triplet of lines and in the range from 11 to 3.1 A° further faint lines occur, namely at the following $d$ values:
13.6 12.0 6.21 6.06 4.51 3.16 3.11 A°, by heating the α-modification of the pigment of the formula (I) in an inert high-boiling organic solvent.

The inert organic solvent used for the manufacture of the β-modification is, for example, an aromatic hydrocarbon, e.g. toluene or xylene, nitrobenzene, dimethyl formamide, but especially a halobenzene, e.g. a mono-, di- or trichlorobenzene, preferably o-dichlorobenzene. The process is carried out advantageously at temperatures between 80°–150° C.

The high-boiling, inert organic solvent used for the conversion of the α-modification into the γ-modification is, for example, 1-chloronaphthalene, preferably however nitrobenzene.

The X-ray diffraction patterns were obtained by a customary powder method in which the diffraction pattern was recorded on film. The film was taken with a Guinierde Wolff camera with a quartz monochromator; $CuK_{α1,2}$ radiation. The corresponding interplanar spacings were calculated from the angles of incidence in the usual manner. Cubic ammonium aluminium sulphate dodecahydrate $[NH_4Al(CO_4)_2 . 12\ H_2O]$ was used as gauge substance for the exact measurement of the angles of incidence and the value a = 12.240 ± 0.002 A° was taken for their lattice constant. The relative intensities of the lines were estimated. The interplanar spacings of one and the same modification show a natural dispersion; for interplanar spacings over A° C it amounts to ± 5% relative and for interplanar spacings under 10 A° ± 2% relative.

The new pigment modifications can be used in finely divided form for pigmenting high molecular weight organic material, e.g. cellulose ethers and esters, for example ethyl cellulose, nitrocellulose, cellulose acetate, cellulose butyrate, natural resins or synthetic resins, e.g. polymerisation resins or condensation resins, for example aminoplasts, especially urea and melamine-formaldehyde resins, alkyde resins, phenolic plastics, polycarbonates, polyolefines, e.g. polystyrene, polyvinyl chloride, polyethylene, polypropylene, polyacrylonitrile, polyacrylic acid esters, polyamides, polyurethanes or polyesters, rubber, casein, silicone and silicone resins, by themselves or in mixtures.

It is immaterial whether the cited materials of high molecular weight are in the form of plastics, melts, or in the form of spinning solutions, lacquers or printing inks. Depending on the use to which they are put, it is advantageous to use the new pigments as toners or in the form of preparations.

The following Examples illustrate the invention, the parts and percentages being by weight unless otherwise stated.

EXAMPLE 1

While stirring 70 parts of the pigment obtained by coupling diazotised 1-aminobenzene-2-carboxylic acid methyl ester with 2,3-oxynaphthoic acid are heated in finely divided state in admixture with 308 parts of o-dichlorobenzene and 30.2 parts of thionyl chloride to 95° C within 1 hour. The reaction mixture is subsequently kept for 10 minutes at 95°–98° C. After the mixture has cooled to 20° C the azo pigment carboxylic acid chloride which has precipitated in crystalline form is isolated by filtration, washed with a small quantity of o-dichlorobenzene, then with benzene, and dried at 70° C in vacuo.

While stirring, 36.85 parts of the resulting carboxylic acid chloride are dissolved in 650 parts of o-dichlorobenzene at 100° C. Over the course of 5 minutes there is added to this solution a 120° C hot solution containing 5.4 parts of 1,4-diaminobenzene in 260 parts of o-dichlorobenzene. The mixture is stirred for 16 hours at 140° – 145° C. The resulting condensation product is filtered off at 100° C, washed first with 100° C warm o-dichlorobenzene, then with 20° C warm methanol, and dried in vacuo at 100° C. The resulting pigment dye is a red powder which is very sparingly soluble in organic solvents and which, in a fine state of division, dyes polyvinyl chloride in brilliant red shades of very good fastness to migration and light. Ultimate analysis of the resulting pigment dye:

|  | C | H | N | O |
|---|---|---|---|---|
| found: | 68.0 | 4.2 | 10.6 | 16.5 |
| calculated: | 68.3 | 4.1 | 10.8 | 16.5 |

The resulting pigment is the β-form of the disazo pigment of the formula I mentioned at the outset.

It is also possible to manufacture the same pigment by the single-step process, i.e. without isolation of the azo pigment carboxylic acid chloride.

EXAMPLE 2

Conversion of the α-modification into the γ-modification

While stirring, 10 parts of the brown disazo pigment obtained in accordance with Example 1 of German patent 943.901 by condensation of the azo carboxylic acid chloride of the formula (II) with p-phenylenediamine in the molar ratio 2:1 and in the presence of pyridine, are boiled for 30 minutes in 215 parts of nitrobenzene. The pigment is filtered off at 100° C, washed first with a small quantity of nitrobenzene of 100° C, then with methanol of 20° C, and dried in vacuo at 100° C to yield 9.4 parts of a soft, red pigment powder which constitutes the γ-form and which can be brought into a form suitable for application by grinding or kneading with salt. It dyes polyvinyl chloride in yellowish red shades of good fastness to light and migration. Other high-blining solvents, e.g. 1-chloronaphthalene, can also effect the conversion into the γ-modification.

Ultimate analysis of the resulting pigment dye:

|  | C | H | N | O |
|---|---|---|---|---|
| found: | 68.2 | 4.2 | 11.0 | 16.4 |
| calculated: | 68.3 | 4.1 | 10.8 | 16.5 |

EXAMPLE 3

65 parts of stabilised polyvinyl chloride, 35 parts of dioctyl phthalate, and 0.2 part of the pigment obtained in accordance with Example 1, are stirred together and worked to and from for 7 minutes at 140° C in a two roll mill. There is obtained a yellowish red sheet of a brilliant shade and possessing very good fastness to light, weather, migration, and overstripe.

EXAMPLE 4

40 parts of a nitrocellulose lacquer, 2.375 parts of titanium dioxide, and 0.125 part of the pigment obtained in Example 1 are ground for 16 hours in a rod mill. An aluminium sheet is coated with a thin layer of the resulting lacquer. A brilliant yellowish red lacquer coating with excellent fastness properties is obtained.

EXAMPLE 5

While cooling, a mixture of 25 parts of the pigment obtained in accordance with Example 1, 25 parts of acetyl cellulose (34.5% of bonded acetic acid), 100 parts of sodium chloride and 50 parts of diacetone alcohol, is treated in a kneader until the desired degree of fineness of the pigment is attained. Then 25 parts of water are added thereto and the mixture is kneaded until a fine grained mass results. This is put into a suction filter and washed with water until no more chlorine ions can be detected in the filtrate. After drying in vacuo at 85° C grinding is effected in a hammer mill. 1.33 parts of the resulting pigment preparation are added to an acetate silk spinning solution consisting of 100 parts of acetyl cellulose and 376 parts of acetone. The pigment is completely dispersed by stirring for 3 hours. The thread obtained from this solution in the customary manner by the drying method has a brilliant red colouration which possesses very good fastness properties.

EXAMPLE 6

The pigment according to Example 1 (0.25 part) is ground for 24 hours in a rod mill with 40 parts of an alkydemelamine stoving varnish, which contains 50% of dye, and 4.75 parts of titanium dioxide. An aluminium sheet is coated with a thin layer of the resulting lacquer and stoved for 1 hour at 120° C. A brilliant red lacquer coating with good resistance to light and weather is obtained.

EXAMPLE 7

4.8 parts of the pigment according to Example 1 are ground in one of the conventional colloid mills with 4.8 parts of the sodium salt of 1,1°-dinaphthylmethane-2,2'-disulphonic acid and 22.1 parts of water until all the pigment particles are smaller than 1μ. The resulting pigment suspension has a pigment content of about 15% By adding this aqueous suspension to a viscous spinning melt there is obtained by the conventional spinning method a brilliant red cellulose thread with very good fastness properties.

EXAMPLE 8

A stabilised mixture consisting of 100 g of a polyvinyl chloride suspension ("Hostalit C 260", Farbwerke Hoechst AG, K value=60), 1.5 g of a complex of barium and cadmium salts of higher fatty acids, complex formers and antioxidants as stabiliser ("Advastab B C 26", deutsche Advance GmbH), 0.5 of a costabiliser based on organic phosphite compounds ("Advastab CH 300", deutsche Advance GmbH), 3.0 g of an epoxidised soya oil ("Advaplast 39", deutsche Advance GmbH), 0.5 g of a glidant ("E-Wachs", Badische Anilin-und Soda Fabrik), 2.0 g of titanium dioxide ("Titandioxid KRONOS Cl 220", Titangesellschaft GmbH, Leverkusen) and 0.1 g of the pigment according to Example 1, is processed for 8 minutes at 180° C in a mixer roller which rotates at a speed of 20:24 (friction 1:1.2) and with a roller spacing of 0.3 mm, and subsequently pressed at a temperature of 180° C to a 1 mm board. The red colouration of the resulting hard polyvinyl chloride board has excellent fastness to rubbing, heat, migration, light, and weather.

EXAMPLE 9

In a three roll mill a graphic printing ink is prepared from 10 g of the pigment according to Example 1, 30 g of toner hydrate, and 60 g of a litho varnish on a linseed oil stand oil base.

The prints obtained therewith by the book printing process are distinguished by a handsome red shade of excellent fastness to light and very good fastness to solvent and overstripe.

EXAMPLE 10

A stabilised mixture consisting of 65 g of a polyvinyl chloride emulsion with a K value of 72-74 ("Lonza GD", Lonza AG, Basle), 32 g of dioctylphthalate, 3 g of an epoxides soya oil as plasticiser ("Advaplast 39", CIBA-GEIGY, Marienberg), 1.5 g of a complex of fatty acid barium and cadmium salts, complex formers and antioxidants as stabiliser ("Advastab B C 26", deutsche Advance GmbH, Marienberg), 0.5 g of a constabiliser based on organic phosphite compounds ("Advastab CH 300", CIBA-GEIGY, Marienberg), 5 g of titanium dioxide ("Titanioxid KRONOS RN 56", Titangesellschaft GmbH, Leverkusen), and 0.5 g of the pigment according to Example 1, is processed for 8 minutes at 160° C in a mixed roller which rotates at a speed of 20:24 (friction 1:1.2) and with a roller spacing of 0.3 mm. The red colouration of the resulting soft polyvinyl chloride sheet has a very good fastness to migration, rubbing, heat, and light.

EXAMPLE 11

A stoving lacquer consisting of 20 g of titanium dioxide (e.g. "Titanioxid KRONOS RN 57", Titangesellschaft GmbH, Leverkusen), 40 g of a 60% solution of a coconut alkyde resin (copolycondensate from coconut oil fatty acid, phthalic acid, and pentaerythritol) in xylene, 24 g of a 50% solution of a malamine resin (e.g. "Superbeckamin 852", Reichhold-Chemie, Hamburg) in butanol, 8 g of xylene, 7 g of ethylene glycol monomethyl ether, and 1 g of the pigment according to Example 1, is finely ground in a ball mill, sprayed on an aluminium sheet, left to dry, and then stoved for 30 minutes at 120° C. The red colouration has very good fastness to weather, overstripe, and heat.

We claim:

1. A disazo pigment of the formula

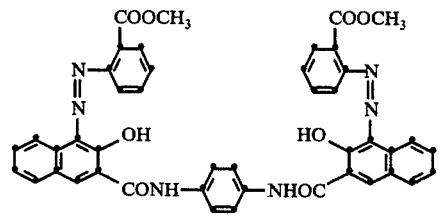

in the β-modification thereof, whose X-ray diffraction pattern at an interplanar spacing of 3.33 A° shows a line of very strong intensity, at 5.38 and 8.33 A° lines of strong intensity, at 3.74, 4.24, 4.68, 4.94, 5.18 and 8.70 A° lines of medium intensity, at 4.05, 4.37, 6.33 and 12.6 A° lines of medium to faint intensity, at 3.50, 3.94, 5.65, 6.09, 6.71, 10.6 and 11.5 A° lines of faint intensity.

2. A process for the manufacture of the β-modification of the disazo pigment according to claim 1, wherein a solution of p-phenylenediamine in an organic solvent is added gradually at elevated temperature to a solution of the acid chloride of the formula

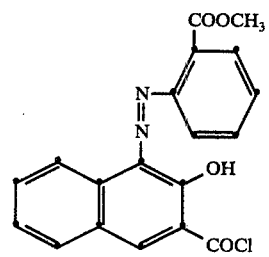

in the molar ratio 1:2.

3. A process according to claim 2, wherein a chlorinated benzene is used as inert organic solvent.

4. A process according to claim 3, wherein o-dichlorobenzene is used.

5. A process according to claim 2, wherein the reaction is carried out at temperatures between 80° C and 150° C.

* * * * *